United States Patent
Rötzheim et al.

(10) Patent No.: US 6,358,419 B1
(45) Date of Patent: Mar. 19, 2002

(54) PROCESS FOR THE PURIFICATION OF WASTEWATER FROM THE ALDOLIZATION REACTION

(75) Inventors: Mariola Rötzheim, Mulheim; Wolfgang Greb, Dinslaken; Wolfgang Zgorzelski, Oberhausen; Carl Dieter Frohning, Wesel; Klaus Denkmann, Oberhausen; Heinz Kalbfell, Schermbeck, all of (DE)

(73) Assignee: Hoechst Aktiengesellschaft (DE)

( * ) Notice: Subject to any disclaimer, the term of this patent is extended or adjusted under 35 U.S.C. 154(b) by 0 days.

(21) Appl. No.: 08/641,514

(22) Filed: May 1, 1996

Related U.S. Application Data

(63) Continuation of application No. 08/264,721, filed on Jun. 23, 1994, now abandoned.

(30) Foreign Application Priority Data

Jun. 29, 1993  (DE) .......................... 43 21 513

(51) Int. Cl.⁷ ................................. C02F 1/44
(52) U.S. Cl. ...................... 210/639; 210/806; 210/908; 210/909; 210/DIG. 5
(58) Field of Search ................. 210/684, 689, 210/908, 909, 639, 638, 806, DIG. 5; 585/864, 867; 568/463, 464

(56) References Cited

U.S. PATENT DOCUMENTS

| 2,441,602 A | * | 5/1948 | Snow et al. | |
| 3,463,818 A | * | 8/1969 | Blumenthal | 568/463 |
| 3,839,458 A | * | 10/1974 | Prinz | 568/492 |
| 3,920,760 A | * | 11/1975 | Heinz | |
| 4,083,931 A | * | 4/1978 | Lee | |
| 4,496,770 A | * | 1/1985 | Duembgen et al. | 568/463 |
| 5,026,919 A | * | 6/1991 | Dessau | 568/463 |
| 6,139,747 A | * | 10/2000 | Rotzheim et al. | 210/639 |

OTHER PUBLICATIONS

Loudon, Organic Chemistry (Second Edition) pp. 287–290. © 1988.*
Noller, Chemistry of Organic Compounds, pp. 230–231, © 1965.*

* cited by examiner

*Primary Examiner*—Mathieu D. Vargot
(74) *Attorney, Agent, or Firm*—Bierman, Muserlian and Lucas

(57) ABSTRACT

Wastewater from the aldolization reaction is purified by adjusting its pH to 0 to 6, followed by extraction with monohydric alcohols having at least 8 carbon atoms, hydrocarbons having at least 6 carbon atoms, and mixtures thereof. In some cases, adjustment of the pH causes the formation of an organic phase, which is separated from the remaining wastewater before extraction.

10 Claims, No Drawings

PROCESS FOR THE PURIFICATION OF WASTEWATER FROM THE ALDOLIZATION REACTION

PRIOR APPLICATION

This application is a continuation of U.S. patent application Ser. No. 08/264,721 filed Jun. 23, 1994, now abandoned.

This Application claims the priority of German Application P 43 21 513.0, filed Jun. 29, 1993.

The invention relates to the purification of wastewater which is produced from the aldolization of identical or different aldehydes or ketones, as well as from the aldolization of a mixture of aldehydes and ketones. The aim of the novel process is to reduce the COD (chemical oxygen demand) value of the wastewater.

BACKGROUND OF THE INVENTION

The term aldolization as used herein includes both the aldol addition and the aldol condensation reactions. The acidic or base catalyzed addition reaction of activated methylene groups onto the carbonyl groups of aldehydes or ketones, with formation of β-hydroxycarbonyl compounds, is termed aldol addition. If elimination of water follows the aldol addition (which occurs readily and is the rule when acid catalysts are used), the reaction is termed aldol condensation. Its products are α,β-unsaturated carbonyl compounds.

The aldolization of two molecules of the identical aldehyde or identical ketone is of particular importance. An example of the industrial application of aldolization is the preparation from n-butyraldehyde of 2-ethylhexanol, which is, after the lower alcohols (methanol to butanol), the most important synthetic alcohol. Phthalic esters of 2-ethylhexanol are extensively used as plasticizers. To obtain the alcohol, n-butyraldehyde is converted into 2-ethylhexenal in the presence of an aqueous sodium hydroxide solution. After separating the aldolization mixture, the unsaturated aldehyde is washed with water and hydrogenated to give the desired alcohol.

In the course of the process, there are produced, as wastewater, the spent aqueous catalyst solution, the wash water used for purification of the 2-ethylhexanol, and water-containing residues of the 2-ethylhexanol distillation. The combined wastewater contains all the water-soluble impurities which occur in the individual process stages, including high proportions of organic compounds, such as butanol, butyric acid, butyrolactone, 2-ethylhexenal, and higher-boiling condensation products. Their concentration is conventionally indicated by the COD value. The COD value is the amount of potassium dichromate, expressed as oxygen equivalent, which is consumed by the oxidizable constituents of one liter of wastewater. It is determined by a standardized procedure described in, e.g., Ullmanns Encyclopädie der technischen Chemie [Ullmann's Encyclopedia of Industrial Chemistry], 4th Edition (1981), Vol. 6, pages 376 ff.

Before the wastewater can be introduced into conventional purification plants, rivers or streams, or other receiving bodies, its content of organic impurities must be markedly decreased in order to comply with the strict legislation with respect to maximum pollutant concentration.

SUMMARY OF THE INVENTION

The object of the Invention is, therefore, to develop a process by means of which the concentration of organic impurities can be considerably decreased in the wastewater, especially to a level which is acceptable for discharge under existing environmental legislation.

According to the invention, this object is achieved by a process which comprises adjusting the wastewater to a pH of 0 to 6, and then extracting the wastewater with monohydric alcohols which contain 8 or more carbon atoms and/or with hydrocarbons which contain more than 6 carbon atoms. If necessary, an organic phase may form on adjusting the pH; if so, it is separated out before extraction.

The novel process is simple to carry out industrially, can easily be adapted to different circumstances, and is distinguished by high economic efficiency and effectiveness. It makes it possible to remove at least 90 percent of the organic impurities in the wastewater.

DETAILED DESCRIPTION OF THE INVENTION

The extraction media used are, according to the invention, higher monohydric alcohols, that is alcohols having 8 or more carbon atoms. Preference is given to alcohols having 8 to 16 carbon atoms; they can be straight or branched chain, saturated or unsaturated. It is not necessary to use pure alcohols; mixtures of isomeric alcohols or of alcohols of different molecular size are also suitable. Those which have proven useful are 2-ethylhexanol, 3,5,5-trimethylhexanol, isooctyl alcohol, nonyl alcohol, decyl alcohol, isodecyl alcohol, and mixtures of isomeric alcohols having 8 to 10 carbon atoms.

In addition to the alcohols, hydrocarbons having more than 6 carbon atoms, in particular those having 6 to 12 carbon atoms, can be used as extraction media. The hydrocarbons, like the alcohols, can be straight or branched chain, saturated or unsaturated. Those which have proven particularly useful are mixtures of different hydrocarbons which are produced as low-boiling fractions in the distillation of mineral oil, in particular light heating oil.

Apart from alcohol mixtures and mixtures of different hydrocarbons, mixtures of alcohols and hydrocarbons can also be used for the extraction of the organic impurities from the wastewater. The mixing ratio can extend over a broad range and is principally restricted by the miscibility of the components. The alcohols and/or hydrocarbons used according to the invention have proven to be excellent extraction media for the organic substances conventionally contained in the wastewater. It is of further importance that they are dissolved in only minor amounts by the water phase.

An important aspect of the novel process is to adjust the generally alkaline wastewater to a pH of 0 to 6, in particular 1 to 3. As a result, virtually complete transfer of the organic components is achieved from the aqueous to the organic phase. Furthermore, by this measure, the solubility of the extraction media in the water is further reduced. It has been found that the solubility of the extraction media is dependent on the pH and is considerably lower in acid than in alkaline media. Therefore, in acid solutions, the extraction media contribute only slightly to the increase in the COD value.

Furthermore, the carboxylic acid salts contained in the wastewater are converted into the corresponding free acids; in accordance with their solubility in water, they form a separate phase which can be separated off even before the extraction step. To adjust the pH, inorganic acids are used, such as hydrochloric acid, sulfuric acid, nitric acid, or phosphoric acid, preferably sulfuric acid.

The extraction of the organic impurities from the wastewater by the process according to the invention is carried out in apparatus conventional for solvent extraction. Those which have proven particularly useful are single or multiple stage extraction batteries, which receive the contaminated wastewater from a plurality of series-connected mixer-separator pairs. Extraction columns having stationary internals, such as packed columns, or having moving internals, such as agitated columns, can likewise be used. The extraction medium and carrier liquid can be conducted in concurrent or, preferably, counter-current flow. Atmospheric pressure and standard temperature conditions are conventionally employed.

The extraction medium can easily be regenerated by distillation and can therefore be used repeatedly. By treatment of the distillation residue, the organic substances contained in the wastewater are isolated.

The novel process is suitable for the treatment of wastewater of the aldolization reaction, independently of the aldolization process employed and the starting materials used. The aldolization can therefore be carried out, e.g., with alkali metal hydroxide, alkali metal carbonate, or amines as catalysts and with aldehydes or ketones as starting materials.

In the following examples, the invention is described in more detail, but is not restricted to these embodiments.

EXAMPLES 1 TO 8

Discontinuous Extraction

The experiments were carried out on the strongly alkaline (pH 12) wastewater produced in the preparation of 2-ethylhexanol (2-EH) from butyraldehyde. The wastewater is a mixture of used aqueous catalyst solution, the wash water used for the purification of the aldol product, and the water-containing residues of the alcohol distillation.

The wastewater is first adjusted to a pH of about 3 by addition of concentrated sulfuric acid. The water phase is then separated from the organic phase produced after acidification and the water phase is extracted with 2-EH in various ratios. The extraction is followed by a separation of the alcohol and water phases which takes place in about 15 minutes. The COD value of the purified wastewater is thereupon determined. The results are summarized in the following Table.

TABLE

| Example | 1 | 2 | 3 | 4 | 5 | 6 | 7 | 8 |
|---|---|---|---|---|---|---|---|---|
| Wastewater: 2-EH [l/l] | 1:1 | 1:1 | 1:1 | 2:1 | 3:1 | 4:1 | 5.25:1 | 8:1 |
| COD value [g/l] | | | | | | | | |
| Feed, alkaline | 47 | 47.8 | 47.8 | 47.8 | 47.8 | 47.8 | 47.8 | 45 |
| Feed, pH 3 | 26 | 30.4 | 30.4 | 30.4 | 30.4 | 30.4 | 30.4 | 17.9 |
| After extraction | | | | | | | | |
| 1st stage | 5 | 4 | 3.5 | 4.6 | 7.1 | 8.8 | 7.9 | 9.4 |
| 2nd stage | | | | | 3.5 | | | 6.4 |
| 3rd stage | | | | | 2.6 | | | |

TABLE-continued

| Example | 1 | 2 | 3 | 4 | 5 | 6 | 7 | 8 |
|---|---|---|---|---|---|---|---|---|
| Decrease of the COD value [%] | | | | | | | | |
| 1st stage | 89.4 | 91.6 | 92.7 | 90.4 | 85.1 | 81.6 | 83.5 | 79.1 |
| 2nd stage | | | | | 92.7 | | | 85.8 |
| 3rd stage | | | | | 94.6 | | | |

EXAMPLE 9

Continuous Extraction

The purification of the wastewater used in Examples 1 to 8 and adjusted to pH 3 is carried out in a ARD from Luwa extractor. The wastewater flows as a continuous phase from top to bottom, and the extraction medium flows as a dispersed phase counter-current thereto. The ratio of wastewater to extraction medium is 8:1. The COD content is reduced from about 22 g/l to 5 g/l.

While only a limited number of embodiments of the present invention have been expressly disclosed, it is, nonetheless, to be broadly construed and not to be limited except by the character of the claims appended hereto.

We claim:

1. A process for the purification of wastewater from an aldolization reaction of butyraldehyde containing organic impurities and comprising as fractions spent aqueous catalyst solution, wash water used for purification of 2-ethylhexenal, and water-containing residues of 2-ethylhexanol distillation, which process comprises adjustment of the pH of said wastewater to 0 to 6 by addition of acid to said wastewater, and thereafter extracting said wastewater with an agent selected from the group consisting of monohydric alcohols having at least 8 carbon atoms, hydrocarbons having at least 6 carbon atoms, and mixtures thereof.

2. The process of claim 1 wherein an organic phase which is formed after the acid addition to the wastewater is separated from said wastewater before the extraction.

3. The process of claim 1 wherein said agent is said alcohols having 8 to 16 carbon atoms.

4. The process of claim 1 wherein said agent is said hydrocarbons having 6 to 12 carbon atoms.

5. The process of claim 1 wherein said pH is 1 to 3.

6. The process of claim 1 wherein said adjustment is carried out by addition of sulfuric acid to said wastewater.

7. The process of claim 2 wherein said agent is said alcohols having 8 to 16 carbon atoms.

8. The process of claim 2 wherein said agent is said hydrocarbons having 6 to 12 carbon atoms.

9. The process of claim 2 wherein said pH is 1 to 3.

10. The process of claim 2 wherein said adjustment is carried out by addition of sulfuric acid to said wastewater.

* * * * *